(12) United States Patent
Scheidhammer et al.

(10) Patent No.: US 11,406,991 B2
(45) Date of Patent: Aug. 9, 2022

(54) SOLID-BOWL CENTRIFUGE SCREW HAVING A SCREW FLIGHT

(71) Applicant: Flottweg SE, Vilsbiburg (DE)

(72) Inventors: Matthias Scheidhammer, Vilsbiburg (DE); Manfred Meyer, Bodenkirchen (DE)

(73) Assignee: FLOTTWEG SE

( * ) Notice: Subject to any disclaimer, the term of this patent is extended or adjusted under 35 U.S.C. 154(b) by 432 days.

(21) Appl. No.: 16/486,186

(22) PCT Filed: Feb. 14, 2018

(86) PCT No.: PCT/DE2018/100131
§ 371 (c)(1),
(2) Date: Aug. 15, 2019

(87) PCT Pub. No.: WO2018/149453
PCT Pub. Date: Aug. 23, 2018

(65) Prior Publication Data
US 2020/0078798 A1 Mar. 12, 2020

(30) Foreign Application Priority Data
Feb. 15, 2017 (DE) .................. 10 2017 103 067.0

(51) Int. Cl.
*B04B 1/20* (2006.01)
*B23K 35/38* (2006.01)
(Continued)

(52) U.S. Cl.
CPC .............. *B04B 1/20* (2013.01); *B23K 35/383* (2013.01); *B04B 2001/205* (2013.01);
(Continued)

(58) Field of Classification Search
CPC .............. B04B 1/20; B04B 2001/2041; B04B 2001/205; B04B 2001/2083; B04B 7/00;
(Continued)

(56) References Cited

U.S. PATENT DOCUMENTS 4,496,340 A 1/1985 Redeker et al.
4,671,448 A 6/1987 Million et al.
(Continued)

FOREIGN PATENT DOCUMENTS

CN 201239665 * 5/2009
CN 102069322 5/2011
(Continued)

OTHER PUBLICATIONS

CN 201239665 Description Espacenet Machine Translation.*
(Continued)

*Primary Examiner* — Walter D. Griffin
*Assistant Examiner* — Shuyi S. Liu
(74) *Attorney, Agent, or Firm* — Gerald E. Hespos; Michael J. Porco

(57) ABSTRACT

A solid-bowl centrifuge screw with a screw flight is provided. The screw flight has at least a first welding layer on a base body of the solid-bowl centrifuge and at least a second welding layer on the first welding layer. Thus, plural welding layers are disposed successively on one another and are applied by shaping build-up welding.

12 Claims, 5 Drawing Sheets

(51) Int. Cl.
    *B23K 9/04*       (2006.01)
    *B23K 9/173*      (2006.01)
(52) U.S. Cl.
    CPC ............. *B04B 2001/2041* (2013.01); *B04B 2001/2083* (2013.01); *B23K 9/046* (2013.01); *B23K 9/173* (2013.01)
(58) Field of Classification Search
    CPC ...... B23K 35/383; B23K 9/046; B23K 9/173; B23K 9/09; B23K 9/1735
    USPC .................................. 494/53, 54, 55, 52, 50
    See application file for complete search history.

(56) References Cited

U.S. PATENT DOCUMENTS

| | | | |
|---|---|---|---|
| 4,775,092 A | 10/1988 | Edmonds et al. | |
| 5,233,150 A | 8/1993 | Schneebeli et al. | |
| 6,274,839 B1 | 8/2001 | Stone et al. | |
| 8,511,476 B2 * | 8/2013 | Cassani | B03B 5/32 |
| | | | 209/288 |
| 2005/0202950 A1 | 9/2005 | Dircks et al. | |

FOREIGN PATENT DOCUMENTS

| | | |
|---|---|---|
| CN | 203526805 | 4/2014 |
| DE | 1 297 034 | 6/1969 |
| DE | 32 16 393 | 11/1983 |
| DE | 44 08 717 | 9/1985 |
| DE | 34 22 638 | 12/1985 |
| DE | 195 16 636 | 2/1996 |
| DE | 603 18 833 | 1/2009 |
| EP | 0 496 181 | 7/1992 |
| EP | 1 005 941 | 6/2000 |
| EP | 1 260 273 | 11/2002 |

OTHER PUBLICATIONS

International Search Report dated May 25, 2018.
Chinese Office Action dated Jan. 19, 2021.
Indian Office Action dated Mar. 26, 2021.
German Office Action dated Dec. 18, 2017.

* cited by examiner

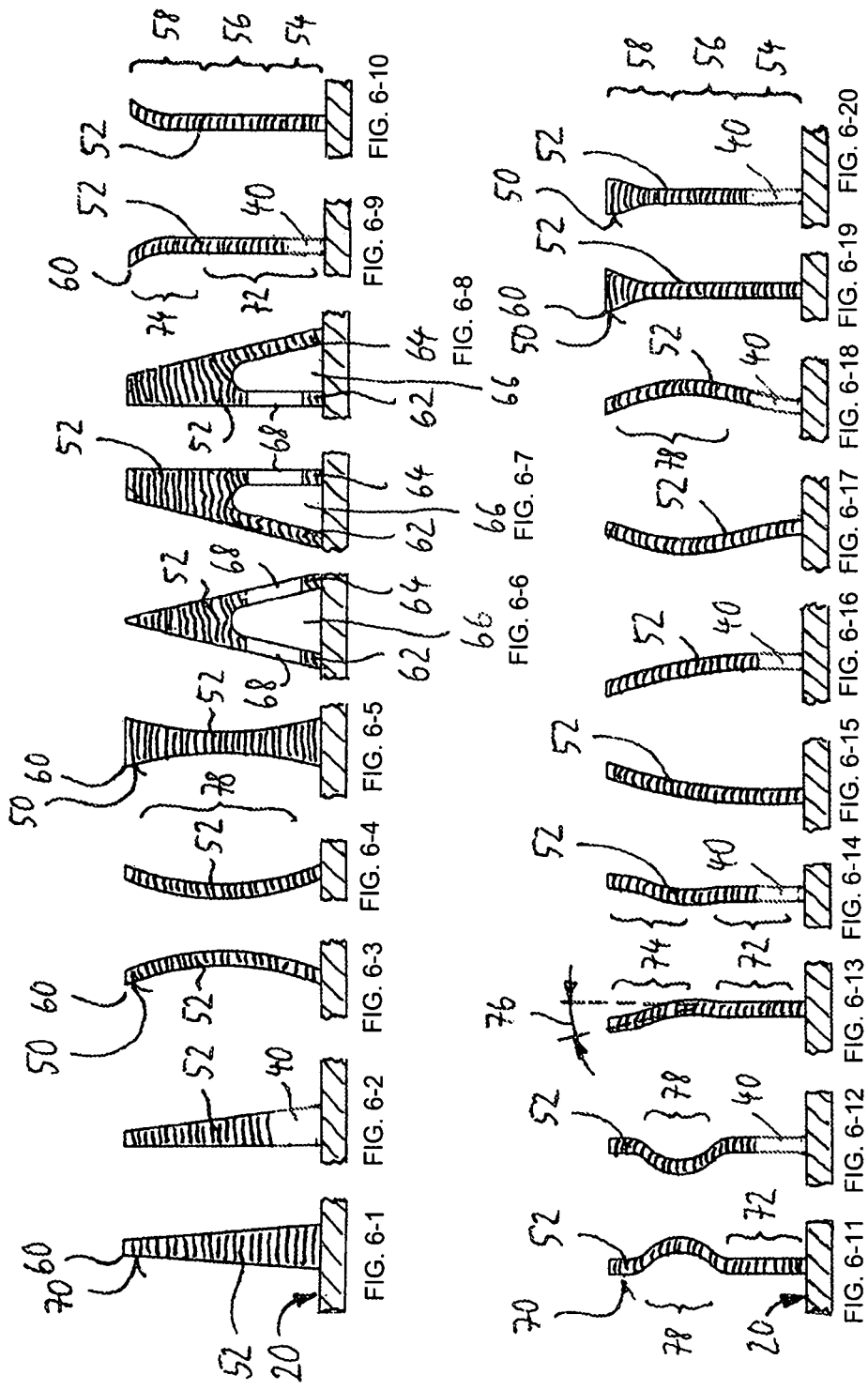

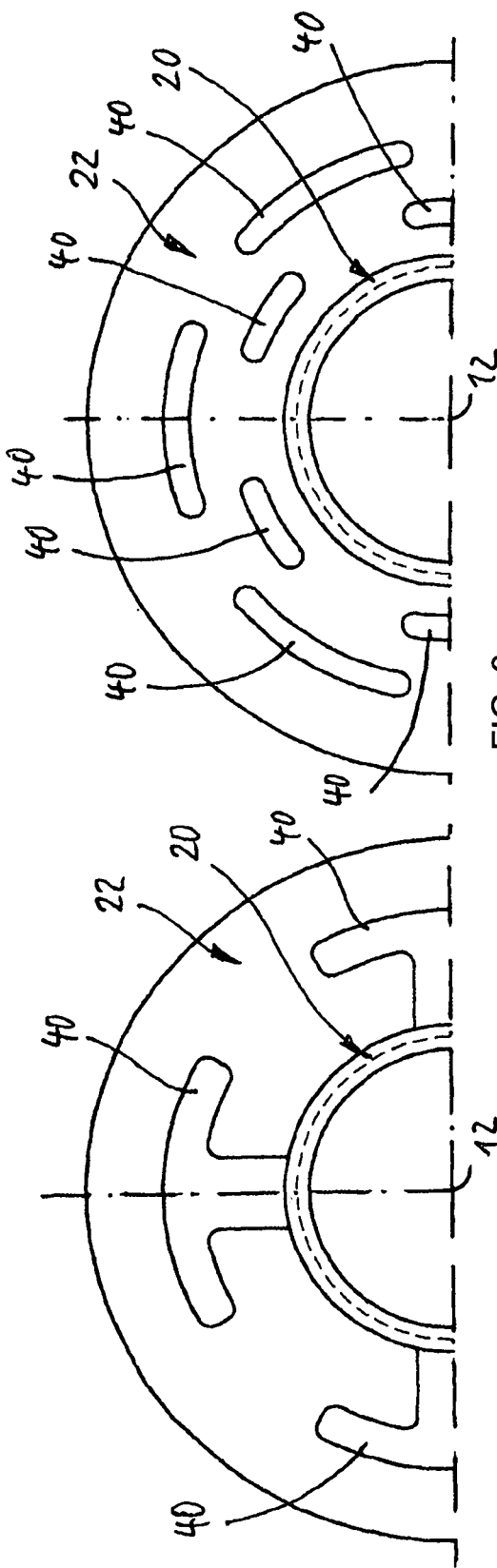
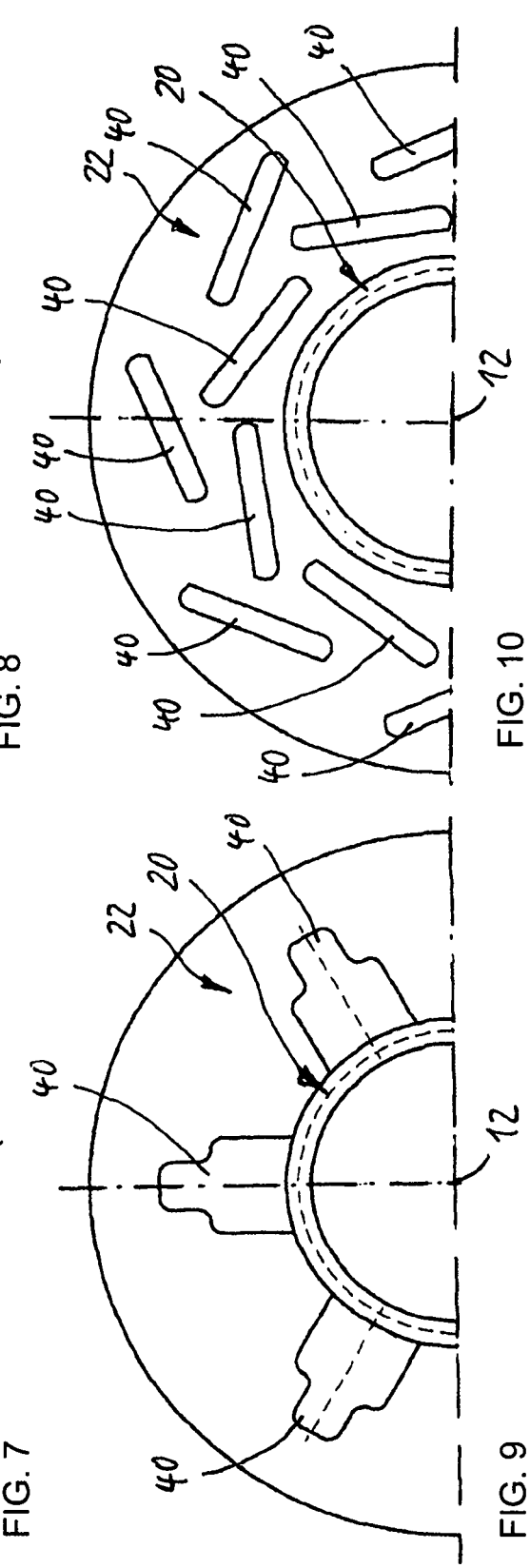
FIG. 7
FIG. 8
FIG. 9
FIG. 10

SOLID-BOWL CENTRIFUGE SCREW HAVING A SCREW FLIGHT

BACKGROUND

Field of the Invention

The invention relates to a solid-bowl centrifuge screw having a screw flight. The invention furthermore relates to a production method of such a solid-bowl centrifuge screw.

Related Art

Known solid-bowl centrifuge screws comprise a screw flight usually extending as a sheet metal wound at the outside around a hollow cylindrically-shaped or tube-shaped screw hub. From the screw hub, the wound sheet metal protrudes radially to the outside approximately at a right angle so far that the sheet metal of the screw fight almost contacts a surrounding drum. The drum of this kind, together with the screw, is part of the substantial components of a solid-bowl centrifuge screw and rotates at a high rotational speed during operation of such a centrifuge.

When the drum is rotating, the likewise rotating screw flight dips into a phase mixture present within the drum. From the phase mixture, the screw flight conveys a heavier or denser phase which is separating radially to the outside from a light or less dense phase collecting radially inside. Depending on the field of application, the heavy phase often comprises particularly heavy solids such as earth, sand and stones.

Especially with such heavy solids and in coaction with the high rotational speeds, the mechanical load on the screw and in particular the screw flight is enormous during operation.

The invention is based on the task of creating a particularly wear-resistant solid-bowl centrifuge screw and a corresponding production method.

SUMMARY

According to the invention, the task is solved by a solid-bowl centrifuge screw having a screw flight, in which the screw flight is produced by means of shaping build-up welding.

By means of the shaping build-up welding, a screw flight according to the invention may be formed completely from welded seams and welding layers, respectively. A first welding layer is applied helically around a screw hub serving as a base body. The base material for the shaping build-up welding according to the invention may comprise chromium-nickel steels, duplex steels and nickel-based steels. A second welding layer subsequently is applied onto the first welding layer, a third welding layer subsequently is applied onto the second welding layer, and so on. The welding layers that are applied consecutively upon one another form a coil surface of the screw flight that radially projects on both sides of the screw hub. Such a coil surface produced by means of shaping build-up welding surprisingly is so hard and rigid that no further processing is required. Thus, a particularly wear-resistant screw flight is produced already after the one working step of the shaping build-up welding. Known screw flights formed of a sheet metal usually need to be post-processed at their coil surfaces and subsequently need to be coated or hardened. In doing so, wear layers are in particular applied. These additionally necessary processing steps, such a coating, result in a screw flight that is considerably more expensive than the solution according to the invention.

Moreover, there is the risk of such a layer wearing during the operation of the solid-bowl centrifuge screw, and detaching from the coil surface over time due to the friction occurring.

In contrast to that, a screw flight is created according to the invention, whose material is not only very hard and rigid, but in addition is designed to be entirely uniform. Thus designed, the screw flight according to the invention features a particularly high and long-lasting wear resistance.

As an alternative, the flight surface according to the invention may also be coated and thus be designed to be even more wear-resistant. In addition to the particularly wear-resistant welding surface, a coating with tungsten carbide creates an even harder surface. A tungsten carbide layer comprises the chemical elements tungsten and carbon, which form interstitial solid solutions. Carbon oxides will deposit between the lattice sites of tungsten. For the coating, preferably fused tungsten carbide (WSC) is applied in a matrix metal onto the flight surface by means of autogenous flame fusion welding.

The screw flight according to the invention may be produced by means of welding with an active and reactive welding gas or with an inert welding gas as the shaping build-up welding. Such welding methods also are referred to as MAG or MIG welding or as welding with active gas or inert gas. As a whole, such methods are referred to as protective gas metal arc welding (MSG). Such welding methods are defined in the EN ISO 4063 standard: process 135 and 131.

A welding gas may be selected in a targeted manner from certain subgroups of welding gases according to the invention. Pursuant to the DIN EN ISO 14175 standard, welding gases are classified into the main groups I, M1 M2, M3, C, R, N, O and Z. In certain embodiments, the welding gases are selected from the main groups I, M1, M2 and N. According to the invention, other welding gases intentionally are exempted, since these welding gases are not target-oriented for the solution aimed at according to the invention as has been shown according to the invention.

Main group I comprises welding gases having nominal 100 percent by volume of argon (subgroup 1), nominal 100 percent by volume of helium (subgroup 2) and nominal 0.5 to 95 percent by volume of helium, as well as a remainder of argon (subgroup 3). These welding gases are completely inert.

Main group M1, subgroup 1, comprises welding gases having nominal 0.5 to 5.0 percent by volume of carbon dioxide, nominal 0.5 to 5.0 percent by volume of hydrogen, as well as a remainder of argon or helium. These welding gases are slightly oxidizing and only slightly reducing. Main group M1, subgroup 2, comprises welding gases having nominal 0.5 to 5.0 percent by volume of carbon dioxide, as well as a remainder of argon or helium. These welding gases are slightly oxidizing. Main group M1, subgroup 3, comprises welding gases having nominal 0.5 to 3.0 percent by volume of oxygen, as well as a remainder of argon or helium. These welding gases are likewise slightly oxidizing. Main group M1, subgroup 4, comprises welding gases having nominal 0.5 to 5.0 percent by volume of carbon dioxide, nominal 0.5 to 3.0 percent by volume of oxygen, as well as a remainder of argon or helium. These welding gases are again slightly oxidizing.

Main group M2, subgroup 0, comprises welding gases having nominal 5.0 to 15.0 percent by volume of carbon dioxide, as well as a remainder of argon or helium. These welding gases are slightly oxidizing. Main group M2, subgroup 1, comprises welding gases having nominal 15.0 to 25.0 percent by volume of carbon dioxide, as well as a remainder of argon or helium. These welding gases are likewise slightly oxidizing. Main group M2, subgroup 2, comprises welding gases having nominal 3.0 to 10.0 percent by volume of oxygen, as well as a remainder of argon or helium. These welding gases as well are still slightly oxidizing. Main group M2, subgroup 3, comprises welding gases having nominal 0.5 to 5.0 percent by volume of carbon dioxide, nominal 3.0 to 10.0 percent by volume of oxygen, as well as a remainder of argon or helium. Main group M2, subgroup 4, comprises welding gases having nominal 5.0 to 15.0 percent by volume of carbon dioxide, nominal 0.5 to 3.0 percent by volume of oxygen, as well as a remainder of argon or helium. Main group M2, subgroup 5, comprises welding gases having nominal 5.0 to 15.0 percent by volume of carbon dioxide, nominal 3.0 to 10.0 percent by volume of oxygen, as well as a remainder of argon or helium. Main group M2, subgroup 6, comprises welding gases having nominal 15.0 to 25.0 percent by volume of carbon dioxide, nominal 0.5 to 3.0 percent by volume of oxygen, as well as a remainder of argon or helium. Main group M2, subgroup 7, comprises welding gases having nominal 15.0 to 25.0 percent by volume of carbon dioxide, nominal 3.0 to 10.0 percent by volume of oxygen, as well as a remainder of argon or helium. These welding gases are also comparatively slightly oxidizing.

Main group N, subgroup 1, comprises welding gases having nominal 100 percent by volume of nitrogen. Main group N, subgroup 2, comprises welding gases having nominal 0.5 to 5.0 percent by volume of nitrogen, as well as a remainder of argon or helium. Main group N, subgroup 3, comprises welding gases having nominal 5.0 to 50.0 percent by volume of nitrogen, as well as a remainder of argon or helium. Main group N, subgroup 4, comprises welding gases having nominal 0.5 to 1.0 percent by volume of hydrogen, nominal 0.5 to 5.0 percent by volume of nitrogen, as well as a remainder of argon or helium. Main group N, subgroup 5, comprises welding gases having nominal 0.5 to 50.0 percent by volume of hydrogen, as well as a remainder of nitrogen. These welding gases are all of a slow reaction, are inert with a high content of argon or helium, and are only slightly reducing even at an increasing hydrogen content.

In summary, welding gases are selected according to the invention in a targeted manner, so that the welding gases are inert, slightly oxidizing and/or slightly reducing. As has been shown according to the invention, in such a method of the shaping build-up welding, one can work with a low-oxidation weld bead and largely without slag. Thus, the welding seams or weld beads may be superimposed in a particularly well positively locking and firmly bonded manner and adhering to one another. Moreover, one can work at a particularly rapid welding speed enabling short manufacturing times. The actual advantage of the rapid welding speed is that the screw hub and already applied weld beads are only slightly selectively heated during welding. Thus, only little distortion or deformation is generated. But the particular advantage of the procedure according to the invention surprisingly is that such a build-up welding results in a particularly high wear resistance of the thereby produced flight surface.

In an advantageous further development of the invention, the welding gas includes a portion of carbon dioxide of nominally less than twenty percent by volume. Such a low content of carbon dioxide allows structural steels to be processed by means of pulsed welding in an advantageous manner according to the invention. At the same time, a comparatively high combustion of the welding wire is possible. This results in a high mass build-up during welding and a particularly rapid operation. Preferably, a welding gas is further used as the welding gas, which includes a portion of oxygen of nominally less than three percent by volume. Such welding gases have a particularly low oxidizing effect. Furthermore, welding gases including a high portion of argon are particularly cheap.

The protective gas welding device according to an embodiment of the invention is operated using a pulsed electric arc. Such a pulsed electric arc permits the melting of the welding wire to be precisely controlled at the protective gas welding device. Moreover, the heat input into the workpiece can be kept particularly low in a targeted manner, and deformation caused by temperature can be kept particularly low.

The electrical welding current of the pulsed electric arc welding device of this kind may feature a base current of less than 200 Amperes and a pulse current greater than 200 Amperes. Such welding currents are advantageous in a particularly precise material build-up at a comparatively low melting performance. A welding gas having nominal 98 percent by volume of argon and nominal 2 percent by volume of carbon dioxide is thereby used as the welding gas.

The protective gas welding device according to an embodiment of the invention operates using a short electric arc, in particular an energy-reduced short electric arc. Such a method using a short electric arc also is referred to as cold-arc, consequently, a method using a particularly cold electric arc may be employed. For achieving a nevertheless powerfully melting electric arc, a boosted melting pulse is worked with in a particularly advantageous manner.

In a further embodiment, the first welding layer is formed to be wider than the second welding layer during build-up welding. This may be done by operating the protective gas welding device at a higher welding current during the application of the first welding layer than during the application of the at least one second welding layer. Alternatively, for the first welding layer, welding can be done in an oscillating manner, at slower welding speed or at higher wire feed rate. Using such a procedure, the first welding layer is realized to have a particularly strong or great mass application. The first welding layer of such a great volume is then superimposed by a second welding layer which has less volume and consequently is narrower. Altogether, a rounded base or foot is produced at the base body of the workpiece, which base body has few notch effect and thus high rigidity.

In another embodiment, the protective gas welding device is operated using one welding wire, or advantageously also two welding wires (twin welding method) having a diameter from 0.5 mm to 3.0 mm, preferably from 10 mm to 16 mm. Surprisingly, such a welding wire diameter results in high welding speed and, at the same time, in a particularly low thermally caused deformation. Particularly preferred are single welding films or welding layers having a width of 6 to 7 mm. A welding ribbon of rectangular cross-section is used in certain embodiments.

The base body of the workpiece according to the invention may be moved during the manufacture of the metallic workpiece. Along with the movement, the workpiece is oriented at its welding site such that an optimum position is achieved for the applied welding layer. In one embodiment, the welding layer is applied to a horizontal surface. It is also advantageous for the welding layer to be applied to a surface slightly rising in the welding direction. The angle of inclination is preferably between 5° and 15°, advantageously between 7° and 10°. The base body is correspondingly and advantageously moved such that a horizontal welding surface or a welding surface slightly rising in the welding direction of the protective gas welding device is present at the welding site of the protective gas welding device.

In another embodiment of the invention, the screw flight has a varying flight pitch in the longitudinal direction of the screw. Such a varying flight pitch allows the speed of the material transport, in particular the transport of the heavy phase, to be adjusted in the longitudinal direction of the screw as required. A small flight pitch improves the material transport for a solid which is difficult to transport. Such a varying flight pitch can be produced by the shaping build-up welding in a particularly rapid and simple manner at high variability and low labor expenditure. Merely, different pitch ranges need to be input into a data processing device controlling an automatic welding device.

Correspondingly rapid, easy and cost-effective to produce, the screw flight can be designed advantageously according to the invention as multi-coil flight by means of the shaping build-up welding. Such a multi-coil flight comprises a plurality of congruent helical curves or helices as flights, which are offset relative to one another in their thread pitch. A screw flight having a multi-coil flight enables great axial movement to be generated at comparatively small rotation. This allows a particularly rapid material transport to be achieved in the longitudinal direction of the screw flight.

According to another embodiment of the invention, the screw flight is provided with a balancing weight that also is produced by shaping build-up welding. With such a balancing weight, uneven mass distributions and constructional unbalances at the screw flight and at the screw hub associated therewith can be compensated. The individual balancing weight may be welded to the screw flight in a particularly precise manner with respect to the site and size. In addition, the balancing weight build-up welded in this way is particularly stably applied to the screw flight as a result of the firmly bonded material application. The balancing expenditure thus is reduced considerably. In particular at the high rotational speeds prevailing during the operation of solid-bowl screw centrifuges, such a stable and locally precise arrangement of the single balancing weight is of great benefit. Imbalance and vibrations caused thereby would otherwise affect almost all of the components by a multiple load.

The screw flight according to an embodiment of the invention has at least one passage opening that also is produced by means of shaping build-up welding. Such a passage opening enables a considerably faster and more energy-saving evacuation of the lighter phase present radially inside as compared to an evacuation by means of a screw flight without passage opening. Without passage opening, the light phase present radially inside must flow off along all of the windings of the screw flight against a transport direction of the heavy phase present radially outside. This path along the windings is considerably longer as compared to a path the light phase has to cover upon passing the at least one passage opening. According to the invention, the passage opening of this kind may have been recessed within the flight surface already during the shaping build-up welding of the screw flight. The screw flight is thus producible in only one working step in a particularly fast and cost-effective manner.

The screw flight according to an embodiment of the invention has a profiled cross-sectional flight surface. By means of the shaping build-up welding, such a profiled cross-sectional flight surface can be manufactured in a particularly simple production manner in a great shape variety depending on individual needs. In this case, the cross-sectional surface of the flight, at its radial end intended to adjoin the screw hub as a flight foot, is designed to be thickened and/or to have a rounding, skew or bevel. Designed in such a way, the light phase flowing along it during operation may flow off without large flow resistances in an energy-saving manner. A flight neck following the flight foot is preferably designed to preferably have a pitch angle or an inclination to the radial outside and to be in particular tapering. Therewith, material flowing along in the central area of the cross-sectional flight surface may thus be boosted in its movement similar to a blade area, whereby energy may be saved in addition. A flight head being radially outside and following the flight neck preferably is designed to have a scraping edge and/or an additional coating. By means of the scraping edge, the heavy phase present radially outside at the drum may be picked up in a particularly extensive manner and pushed out from the drum. The additional coating can protect the particularly massively loaded areas of the flight from abrasion especially by sand and gravel.

Moreover, a disc with damming effect in the form of a baffle plate, submerged disc or flotation disc is formed at the screw flight in an advantageous manner according to an embodiment of the invention, and this disc also is produced by means of shaping build-up welding. A disc manufactured in such a way can be mounted especially to the associated screw hub in a particularly stable, simple and cost-efficient manner. In this case, the disc having a damming effect preferably is mounted to the screw hub where no flight blade is arranged. The disc with damming effect is present at a conical portion of the screw hub, behind which only heavy phase is to be evacuated in the discharging direction of the heavy phase. The disc with damming effect thereby ends with its diameter radially further inside than the drum and thus serves as a weir for preventing the lighter phase present radially inside from being moved onward in the discharging direction of the heavy phase.

Further, a scraper is formed at the screw flight according to an embodiment of the invention, and the scraper also may be produced by means of shaping build-up welding. Produced in such a way, the scraper is likewise particularly cost-efficient to produce and particularly stable during operation. It is precisely such a scraper that needs to be particularly stable and be able to withstand high force impacts. At an end area of the screw flight situated in the discharging direction of the heavy phase, the scraper has the function to scrape off the heavy phase, in particular solids, from the screw flight.

The invention furthermore relates to a production method of a solid-bowl centrifuge screw, in which the screw flight is produced by means of shaping build-up welding.

BRIEF DESCRIPTION OF THE DRAWINGS

FIGS. 6-1 through 6-20 are variants of detail VI according to FIG. 2.

FIG. 7 is a first variant of view VII according to FIG. 5.

FIG. 8 is a second variant of view VII according to FIG. 5.

FIG. 9 is a third variant of view VII according to FIG. 5.

FIG. 10 is a fourth variant of view VII according to FIG. 5.

DETAILED DESCRIPTION

Figure 1:
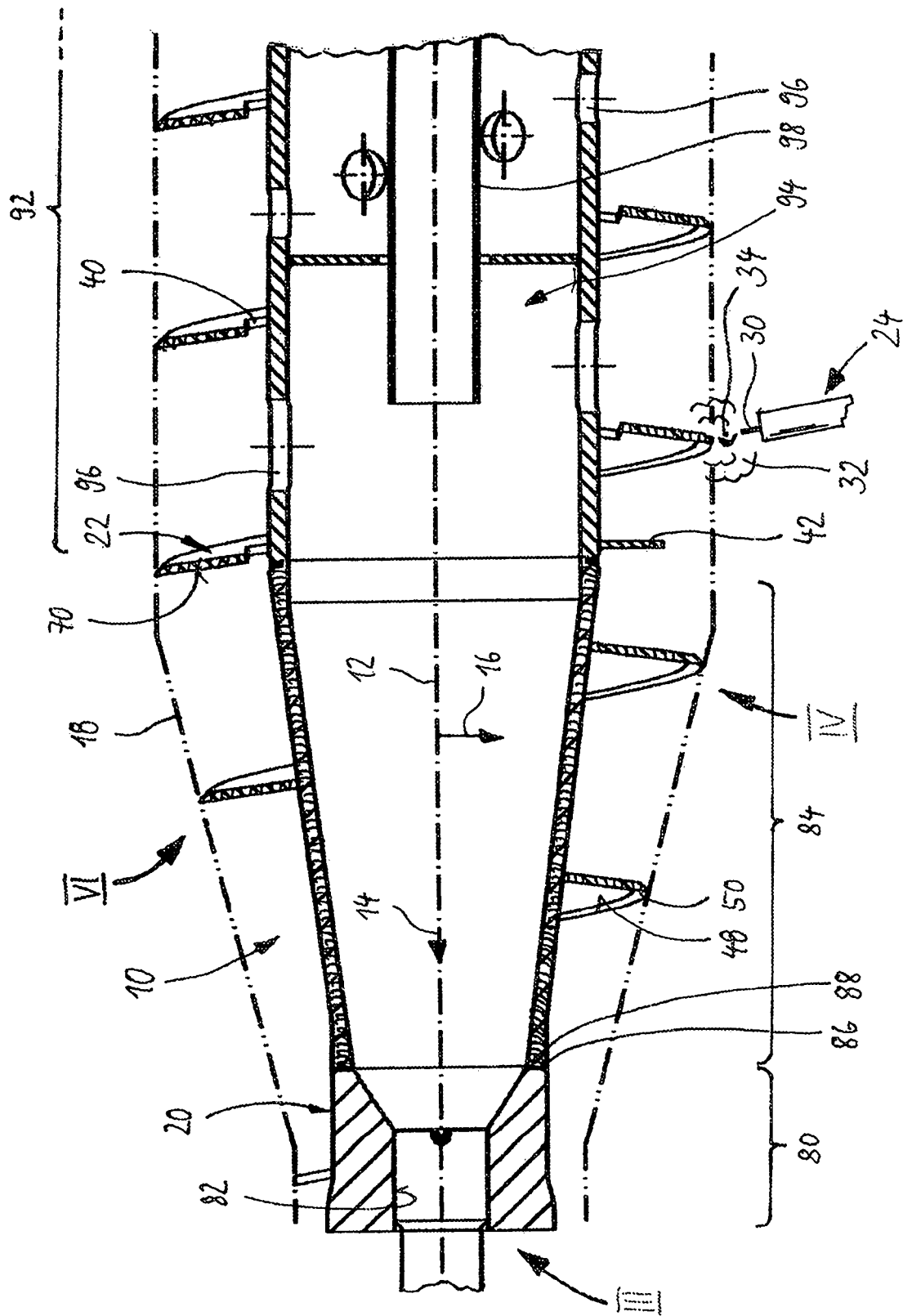
FIG. 1 is a first part of a longitudinal section of a solid-bowl centrifuge screw according to the invention.
Figure 3:
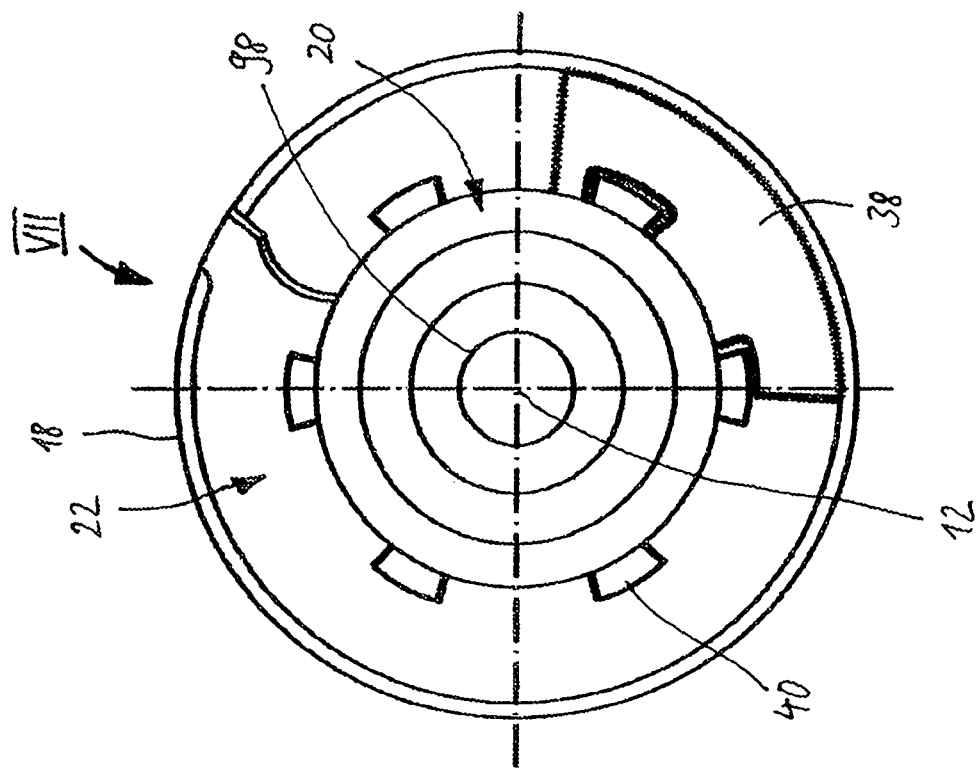
FIG. 3 is a side view of cutout III according to FIG. 1.

In FIGS. 1 to 10, a screw 10 of a solid-bowl screw centrifuge is illustrated which is to be produced as a workpiece mentioned here. The screw 10 includes a rotational axis 12 defining an axial direction 14 and a radial direction 16.

The screw 10 is surrounded by a drum 18 and serves the purpose of discharging from a phase mixture (not shown) within the drum 18 a heavy phase in the axial direction 14. The screw 10 is designed to have a central screw hub 20 and a screw flight 22 surrounding the same in a helical shape.

Further, a protective gas welding device 24 is provided by means of which the screw flight 22 is produced in shaping build-up welding. For this purpose, a first welding layer 26 is applied to the screw hub 20 and then a second welding layer 28 is applied to said first layer by means of the protective gas welding device 24. Moreover, further welding layers have been applied in this way on top of each other or upon each other. Thus, a two-dimensional helical element or a screw-shaped surface has been generated which forms the screw flight 22.

When the screw flight 22 is produced in this way by shaping build-up welding, the screw hub 20 serves as a first base body and is moved during production. The screw hub 20 is in particular rotated about its rotational axis 12 while the protective gas welding device 24 is at the same time displaced in the axial direction 14 and is in this case raised gradually in the radial direction 16.

The protective gas welding device 24 comprises a welding wire 30 and is operated in the MSG method with a protective gas 32. Presently, the protective gas 32 is selected from one of the subgroups of the main groups I, M1, M2 or N of DIN EN ISO 14175 standard and includes a portion of carbon dioxide of nominally less than twenty percent by volume as well as a portion of oxygen of nominally less than three percent by volume. Thereby, an electric arc 34, which is realized in the present case as a pulsed electric arc, is generated by means of the protective gas welding device 24.

The screw flight 22 may in this way be realized particularly easily and at low cost to be of low warpage and at the same time particularly wear-resistant. In particular, a multi-coil flight may also be produced in a simple manner. The screw flight 22 may also be designed to have a flight pitch 36 varying in the axial direction 14 or in the longitudinal direction of the screw 10 and thus is differently sized.

By means of the shaping build-up welding, a balancing weight 38 may further be produced at the same time on the screw flight 22. By means of single welding spots and/or larger accumulations of welding material, the balancing weight 38 may be dimensioned individually and precise in location. The balancing effort is thus considerably reduced.

The screw flight 22 further s to be provided with various passage openings 40 in a very simple manner and without metal cutting processes, since it is produced by means of shaping build-up welding.

Also, a disc 42 having a damming effect is at the same time produced on the screw flight 22 by shaping build-up welding. The disc 42 may act as a baffle plate but also as a submerged disc or flotation disc.

Furthermore, a scraper 44 is also molded to the screw flight 22 at its end area on the screw hub 20 by means of shaping build-up welding.

Figure 4:
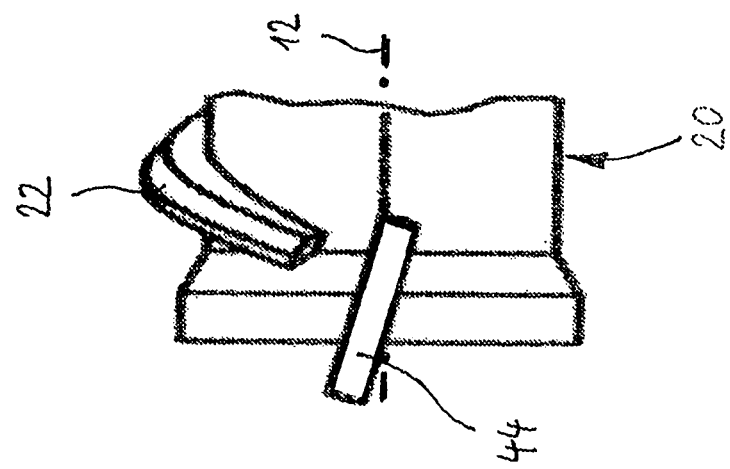
FIG. 4 shows a detail IV according to FIG. 1 in an enlarged representation.

A transition 46 from the screw hub 20 to the screw flight 22 is designed shaping build-up welding as a rounding, skew or bevel. For this purpose, the first welding layer 26, as illustrated in FIG. 4, is produced to be wider than the second welding layer 28 arranged above. The wider welding layer 26 is in particular produced using a higher welding current, an oscillating welding method or a lower welding feed rate.

A lateral flight surface 48 of the screw flight 22 has been mechanically post-processed after its production by means of build-up welding. However, such a post-processing is not absolutely necessary. Optionally, a wear-resistant coating 50 of tungsten carbide has been produced on the flight surface 48. This coating has also been produced as a single layer by build-up welding by means of the protective gas welding device 24.

The cross-sectional flight surface 52 of the screw flight 22 is advantageously formed in various variants according to FIG. 6 to be profiled. In this case, the cross-sectional flight surface 52 includes, radially inside, a flight foot 54, radially further outside, a flight neck 56, and radially furthest outside, a flight head 58.

Figure 2:
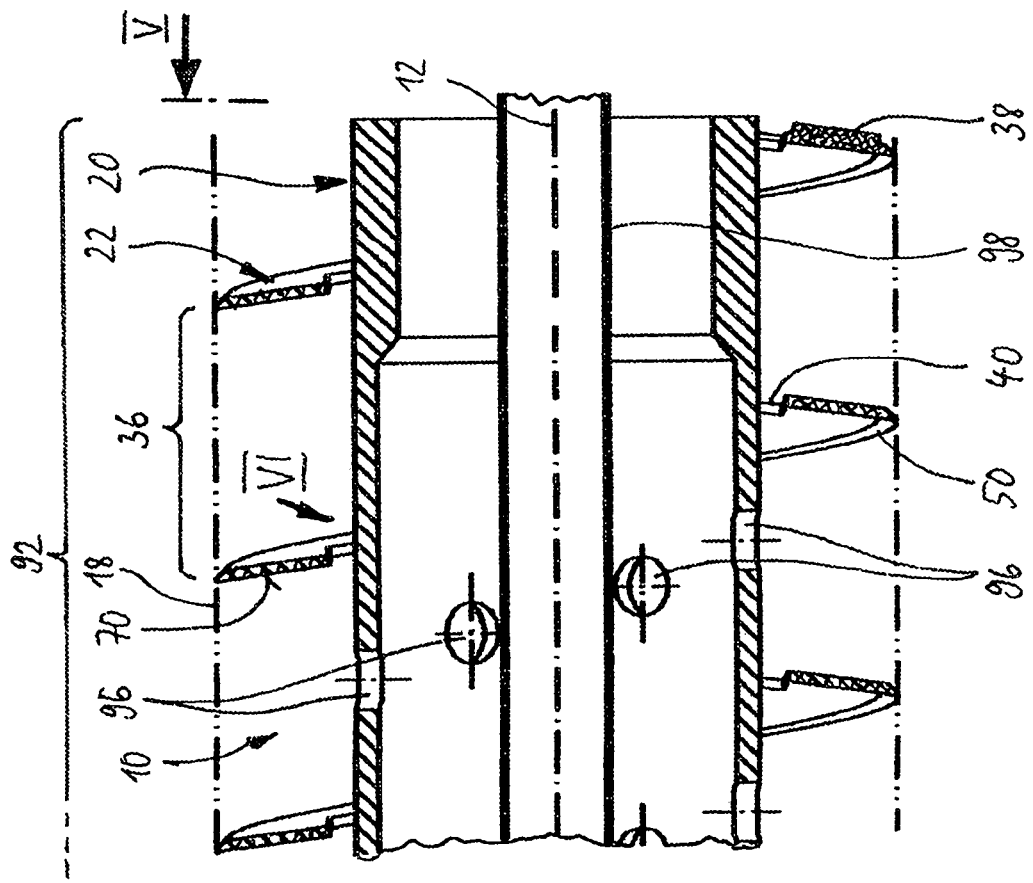
FIG. 2 is a second part of the longitudinal section according to FIG. 1.
Figure 5:
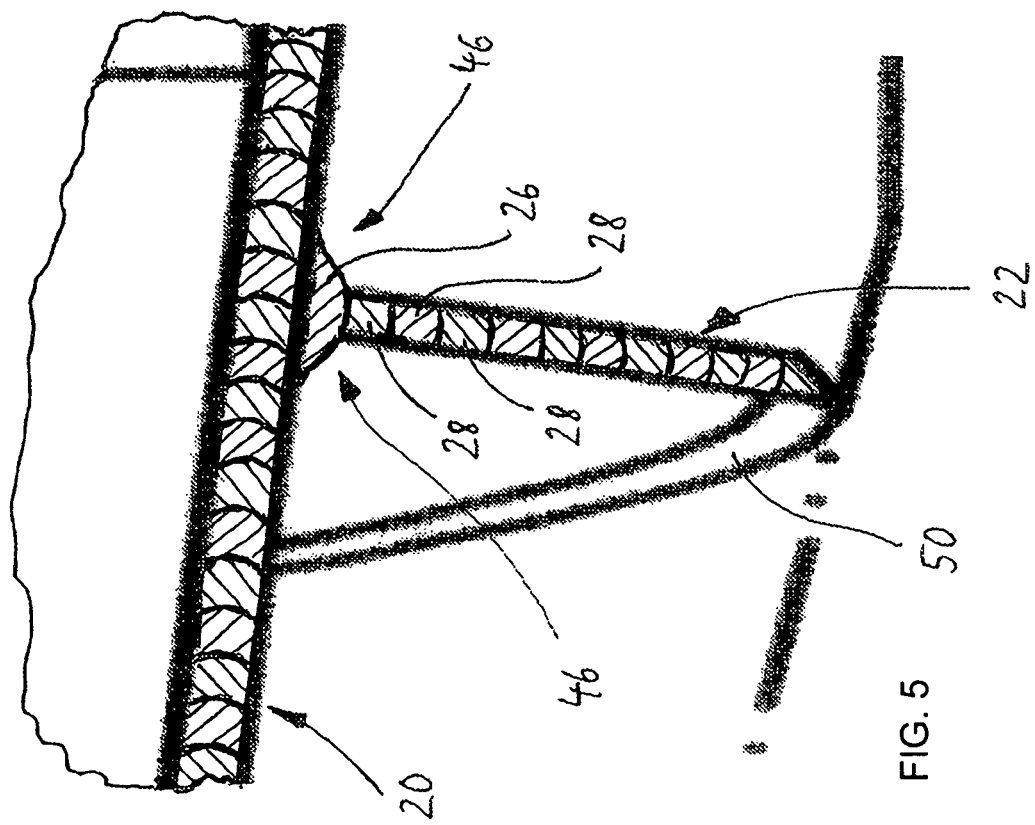
FIG. 5 is top view V according to FIG. 2.

The cross-sectional flight surface 52 is designed according to the two variants in FIGS. 6-1 and 6-2 to be tapering radially to the outside in the radial direction 16. According to a variant in FIGS. 6-5, 6-19 and 6-20, the profiled cross-sectional flight surface 52 has a flight head 58 which is designed to be thickened in the axial direction 14.

In several variants, a scraping edge 60 axially inclined toward the scraping direction and carrying the coating 50 is formed on the flight head 58.

According to three variants in FIGS. 6-6 through 6-8 on the top in the middle, the cross-sectional flight surface 52 has a first supporting web 62 and a second supporting web 64, wherein the supporting webs 62 and 64 are mostly radially directed. A free space 66 is present between the supporting webs 62 and 64 in the axial direction. In this way, a light-weight and at the same time statically particularly stable construction is created.

A passage opening 68 penetrates at least one of the supporting webs 62 and 64, and is situated in particular in the second supporting web 64 facing away from the scraping side 70 of the screw flight 22.

According to variants in FIGS. 6-9 through 6-12 on the top right and bottom left sides, the profiled cross-sectional flight surface 52 has a first portion 72 extending in the radial direction 16, and a second portion 74 designed to be inclined to the radial direction 16. An angle of inclination 76 or a tilt of this second portion 74 is in this case preferably between 10° and 40°, in particular between 15° and 20°.

According to several variants in FIGS. 6-3, 6-4, 6-11, 6-12, 6-17 and 6-18, the profiled cross-sectional flight surface 52 has a third portion 78 which, as seen in cross-section, is curved in the form of a bowl.

The screw hub 20 has likewise been produced at least in part by means of shaping build-up welding using the protective gas welding device 24.

With respect to FIG. 1 on the very left side, the screw hub 20 has in this case a cylindrical first longitudinal portion 80 which serves herein as a second base body for build-up welding. The longitudinal portion 80 itself correspondingly has not been produced by build-up welding, but has been produced in a conventional manner as a tube which has been further turned and milled.

At the longitudinal portion 80, a first bearing support 82 for the screw 10 has been formed by means of turning or a turning method.

The longitudinal portion 80 is followed on the screw hub 20 in the direction of the rotational axis 12 by a frustoconical second longitudinal portion 84 which has been formed by means of shaping build-up welding. In this case, an annular first welding layer 86, and upon this layer, in the direction of the rotational axis 12 or opposite to the axial direction 14, a second welding layer 88 as well as a multitude of further second welding layers have been applied to the longitudinal portion 84.

In the build-up welding of this kind, the first longitudinal portion 80 has been moved and in particular turned, wherein the protective gas welding device 24 then is to be displaced opposite to the axial direction 14 but otherwise is to be moved radially only slightly in order to form the frustoconical shape.

The second longitudinal portion 84 is followed, opposite to the axial direction 14, by a cylindrical third longitudinal portion 92 which is substantially tubular and has been produced conventionally. The longitudinal portion 92 may also be produced advantageously by means of build-up welding and thereby be designed to be grid-shaped. An inlet chamber 94, into which the phase mixture to be clarified can be introduced, is present at the longitudinal portion 92. This inlet chamber 94 is produced in an in particular advantageous manner by means of shaping build-up welding, since individually designed flow surfaces may then be formed thereon.

Outlet openings 96 to be produced in the longitudinal portion 92 in the area of the inlet chamber 94 may be formed advantageously by means of build-up welding.

Radially inside or concentrically to the rotational axis 12, an inlet pipe 98 is present in the area of the longitudinal portion 92. This inlet pipe 98 is likewise advantageously produced by means of shaping build-up welding, so that special flow and guiding surfaces may be formed thereon in a targeted manner.

In FIGS. 7 to 10, various embodiments of passage openings 40 in the respective associated screw flight 22 along with the associated screw hub 20 are illustrated.

In this case, the individual passage opening 40 according to FIG. 7, radially at the center, has a particularly wide portion in the circumferential direction. Through this portion, a middle layer of the phase mixture to be clarified may pass through the screw flight 22 in a targeted manner.

According to FIG. 8, a plurality of passage openings 40 are arranged on two different radii in the radial direction 16. In this case, the radially outer passage openings 40 have a greater width in the circumferential direction than the radially inner passage openings. Also, with this embodiment, material to be clarified of a circumferential layer may pass through the screw flight 22 in a targeted manner.

An embodiment is illustrated n FIG. 9, in which the passage openings 40 are wider radially inside than radially outside. This difference in width is designed to be stepped in the circumferential direction. With this embodiment, more material may pass at the screw flight 22 after having reached the radius of the step toward the inside.

FIG. 10 finally shows an embodiment in which the passage openings 40 are designed as straight slots obliquely inclined to the radial direction 16. When material passes through them, the slots of this kind result in mixing and thus breaking up the material to be clarified.

In conclusion, it should be noted that all of the features mentioned in the application documents and in particular in the dependent claims, despite the formal back reference made to one or more certain claims, should be provided with independent protection even individually or in any combination.

LIST OF REFERENCE NUMERALS

10 screw
12 rotational axis
14 axial direction
16 radial direction
18 drum
20 screw hub
22 screw flight
24 protective gas welding device
28 first welding layer of the screw flight
28 second welding layer of the screw flight
30 welding wire
32 welding gas
34 electric arc
36 flight pitch
38 balancing weight
40 passage opening
42 disc
44 scraper
46 transition
48 flight surface
50 coating
52 cross-sectional flight surface
54 flight foot
56 flight neck
58 flight head
60 scraping edge
62 first supporting web
64 second supporting web
66 free space
68 passage opening
70 scraping side
72 first portion of the cross-sectional flight surface
74 second portion of the cross-sectional flight surface
76 angle of inclination
78 third portion of the cross-sectional flight surface
80 first longitudinal portion of the screw hub
82 first bearing support
84 second longitudinal portion of the screw hub
86 first welding layer at the screw hub
88 second welding layer at the screw hub
92 third longitudinal portion of the screw hub
94 inlet chamber
96 outlet opening
98 inlet pipe

The invention claimed is:

1. A solid-bowl centrifuge screw (10) comprising: a screw hub (20) defining a base body and a screw flight (22), the screw flight (22) being produced by shaping build-up welding so that the screw flight (22) has a first welding layer disposed on the base body and at least a second welding layer disposed on the first welding layer, wherein the screw flight (22) is formed completely from welding layers.

2. The solid-bowl centrifuge screw of claim 1, wherein the screw flight (22) has a varying flight pitch (36) in a longitudinal direction of the screw (10).

3. The solid-bowl centrifuge screw of claim 1, wherein the screw flight (22) is a multi-coil flight.

4. The solid-bowl centrifuge screw of claim 1, wherein the screw flight (22) further comprises plural welding layers applied successively by shaping build-up welding to define a balancing weight (38).

5. The solid-bowl centrifuge screw of claim 1 wherein the screw flight (22) further comprises at least one welding layer disposed to define at least one passage opening (40).

6. The solid-bowl centrifuge screw of claim 1, wherein the screw flight (22) has a profiled cross-sectional flight surface (52) so that the screw flight (22) has an alignment at a first projecting distance from the screw hub (20) that is different from an alignment at a second projecting distance from the screw hub (20).

7. The solid-bowl centrifuge screw of claim 1, further comprising a plurality of welding layers disposed successively on the screw flight (22) and forming a disc (42) having a damming effect, the plurality of welding layers that form the disc (42) being produced by means of shaping build-up welding.

8. The solid-bowl centrifuge screw of claim 1, further comprising a plurality of welding layers disposed successively on the screw flight (22) and forming a scraper (44), the plurality of welding layers that form the scraper (44) being produced by means of shaping build-up welding.

9. A production method of a solid-bowl centrifuge screw (10), the method comprising: providing a screw hub (20) as a base body; and using a welding device (24) for applying a screw flight (22) to the screw hub (20) by shaping build-up welding, the screw flight (22) being formed by applying a first welding layer (26, 86) to the screw hub (20) so that the first welding layer (26, 86) extends helically around the screw hub (20) and then applying a second welding layer (28, 88) to the first welding layer (26, 86).

10. The production method of claim 9, wherein, the first welding layer (26; 86) is formed to be wider than the second welding layer (28; 88).

11. The solid-bowl centrifuge screw of claim 1, wherein the screw flight (22) has a profiled cross-sectional flight surface (52) so that the screw flight (22) narrows at distances farther from the screw hub (20).

12. The solid-bowl centrifuge screw of claim 1, wherein the welding layers (26, 28) are applied so that the screw flight (22) narrows at distances farther from the screw hub (20).

* * * * *